US008751087B1

United States Patent
Dufford

(10) Patent No.: US 8,751,087 B1
(45) Date of Patent: Jun. 10, 2014

(54) HYBRID VEHICLE SYSTEM LOSS LEARNING

(71) Applicant: Toyota Motor Engineering & Manufacturing North America, Inc., Erlanger, KY (US)

(72) Inventor: Mohammad E. Dufford, Los Angeles, CA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 13/789,534

(22) Filed: Mar. 7, 2013

(51) Int. Cl.
  *G06F 7/00* (2006.01)
  *B60W 10/06* (2006.01)
  *B60W 10/08* (2006.01)
  *B60W 20/00* (2006.01)
  *G01R 27/02* (2006.01)
  *G01R 31/00* (2006.01)

(52) U.S. Cl.
  CPC ............... *B60W 10/06* (2013.01); *B60W 10/08* (2013.01); *B60W 20/00* (2013.01); *G01R 27/025* (2013.01); *G01R 31/007* (2013.01)
  USPC .......... 701/22; 701/31.4; 701/29.6; 701/33.6; 701/54; 180/65.23; 700/97

(58) Field of Classification Search
  CPC ..... B60W 10/06; B60W 10/08; B60W 20/00; G01R 27/025; G01R 31/007
  USPC ............ 701/1, 2, 22, 29, 29.6, 33.6, 54, 31.4; 385/24; 117/1; 222/25.13; 431/86; 398/141; 700/97; 180/65.23; 318/479
  See application file for complete search history.

(56) References Cited

U.S. PATENT DOCUMENTS

| 6,442,455 | B1 | 8/2002 | Kotre et al. | |
|---|---|---|---|---|
| 6,755,266 | B2 | 6/2004 | Lasson | |
| 7,089,099 | B2 * | 8/2006 | Shostak et al. | 701/29.6 |
| 7,103,460 | B1 * | 9/2006 | Breed | 701/32.9 |
| 7,234,552 | B2 | 6/2007 | Prema et al. | |
| 7,377,344 | B2 | 5/2008 | Barske | |
| 7,421,321 | B2 * | 9/2008 | Breed et al. | 701/33.6 |
| 7,654,355 | B1 | 2/2010 | Williams | |
| 7,908,067 | B2 | 3/2011 | Soliman et al. | |
| 8,068,947 | B2 | 11/2011 | Conlon et al. | |

(Continued)

OTHER PUBLICATIONS

Chen, et al.; "Intelligent Vehicle Power Management Using Machine Learning and Fuzzy Logic"; *2008 IEEE International Conference on Fuzzy Systems (FUZZ 2008)*; pp. 2351-2358; 2008.

*Primary Examiner* — McDieunel Marc
(74) *Attorney, Agent, or Firm* — Snell & Wilmer LLP

(57) ABSTRACT

A system and method for hybrid vehicle system loss learning. A hybrid vehicle includes an engine, a motor-generator, a battery, a battery module configured to measure a battery power of the battery, a memory configured to store system loss data including engine speed adjustments corresponding to vehicle speeds and power requests, and a processor configured to determine a system loss for a vehicle speed and a power request, apply an engine speed adjustment based on the system loss data, and store the engine speed adjustment and a post-adjustment system loss in the system loss data when the engine speed adjustment improves the system loss. The hybrid vehicle stores data on system losses and relevant conditions such as vehicle speed and power requests. The hybrid vehicle can improve the engine speed adjustment from successive adjustments for those conditions based on the stored data.

21 Claims, 4 Drawing Sheets

(56) References Cited

U.S. PATENT DOCUMENTS

| | | |
|---|---|---|
| 8,086,364 B2 | 12/2011 | Xue et al. |
| 8,116,925 B2 | 2/2012 | Wang et al. |
| 8,157,035 B2 | 4/2012 | Whitney et al. |
| 8,386,104 B2 * | 2/2013 | Kuang et al. ............... 701/22 |
| 8,387,599 B2 * | 3/2013 | McAlister ................ 123/675 |
| 2005/0182526 A1 * | 8/2005 | Hubbard et al. ............. 701/1 |
| 2005/0252305 A1 * | 11/2005 | Hubbard et al. ............ 73/860 |
| 2005/0256623 A1 * | 11/2005 | Hubbard et al. ........... 701/54 |
| 2005/0273218 A1 * | 12/2005 | Breed et al. ................ 701/2 |
| 2006/0025897 A1 * | 2/2006 | Shostak et al. ............. 701/1 |
| 2007/0078580 A1 * | 4/2007 | Cawthorne et al. ........ 701/51 |
| 2010/0056328 A1 | 3/2010 | Schenk et al. |
| 2010/0250037 A1 | 9/2010 | Yoshida et al. |
| 2011/0161025 A1 | 6/2011 | Tomura et al. |
| 2011/0276216 A1 * | 11/2011 | Vaughan .................... 701/29 |
| 2012/0053765 A1 | 3/2012 | Whitney et al. |
| 2012/0059565 A1 | 3/2012 | Kozarekar et al. |
| 2012/0109408 A1 | 5/2012 | Siy et al. |
| 2013/0179020 A1 * | 7/2013 | Morimoto ................. 701/22 |

* cited by examiner

HYBRID VEHICLE SYSTEM LOSS LEARNING

BACKGROUND

1. Field

The present disclosure relates to a system and method for hybrid vehicle system loss learning and more particularly to a system and method of using hybrid powertrain signals to detect the total system losses and perform long-term learning of the system losses to improve control accuracy and optimize fuel efficiency.

2. Description of the Related Art

Hybrid vehicles have become more popular because of rising fuel costs. The improved fuel efficiency of hybrid vehicles over conventional internal combustion engine (ICE) vehicles is particularly attractive to consumers. As hybrid vehicles become more commonplace, consumers may have raised expectations for fuel efficiency. Consumers may also become aware of the diminishing fuel efficiency of aging vehicles.

A hybrid vehicle utilizes both an engine, such as an internal combustion engine (ICE), and an electric motor, such as a motor-generator, to provide power to the wheels. When there is a power request from the driver, the hybrid system determines how to deliver that power to the wheels, using a combination of the engine and the electric motor. However, the power commanded by the hybrid system may not equal the power actually delivered to the wheels. The difference in power is a system loss, or loss. Due to such losses, the hybrid system's power calculations may be off, reducing control accuracy and negatively affecting fuel efficiency.

Current hybrid systems may have predetermined calculations, which may be stored in a map, to account for system losses. However, the predetermined calculations may be determined from bench testing results. Therefore, the predetermined calculations fail to account for variations between the vehicles themselves, as well as aging of the hardware. The predetermined calculations may not always provide the optimal control to account for losses.

Thus, there is a need for a system and method directed to long-term learning of an individual hybrid vehicle's system losses to improve control accuracy and optimize fuel efficiency.

SUMMARY

The present disclosure relates to a system and method for long-term learning of system losses to improve control accuracy and optimize fuel efficiency, and in particular improving control accuracy and optimizing efficiency considering vehicle variation and hardware aging.

In one implementation, a system for hybrid vehicle system loss learning comprises an engine, a motor-generator, a battery, a battery module configured to measure a battery power of the battery, a memory configured to store system loss data including engine speed adjustments corresponding to vehicle speeds and power requests, and a processor configured to determine a system loss for a vehicle speed and a power request, compare the system loss with an expected loss for the vehicle speed and the power request, apply an engine speed adjustment based on the system loss data, and store the engine speed adjustment and a post-adjustment system loss in the system loss data when the engine speed adjustment improves the system loss.

In another implementation, a hybrid vehicle comprises an engine, a motor-generator, a battery, a battery module configured to measure a battery power of the battery, and a hybrid controller module configured to store system loss data including engine speed adjustments corresponding to vehicle speeds and power requests, determine a system loss for a vehicle speed and a power request, compare the system loss with an expected loss for the vehicle speed and the power request, apply an engine speed adjustment based on the system loss data, and store the engine speed adjustment and a post-adjustment system loss in the system loss data when the engine speed adjustment improves the system loss.

In yet another implementation, a method for long-term system loss learning in a hybrid vehicle comprises determining a system loss for a vehicle speed and a power request, comparing the system loss with an expected system loss for the vehicle speed and the power request, comparing the vehicle speed and the power request with system loss data including engine speed adjustments corresponding to vehicle speeds and power requests, determining an engine speed adjustment based on the system loss data, applying the engine speed adjustment, determining a post-adjustment system loss, storing the engine speed adjustment and the post-adjustment system loss in the system loss data when the post-adjustment system loss is an improvement over the system loss.

BRIEF DESCRIPTION OF THE DRAWINGS

Other systems, methods, features, and advantages of the present disclosure will be or will become apparent to one with skill in the art upon examination of the following figures and detailed description. It is intended that all such additional systems, methods, features, and advantages be included within this description, be within the scope of the present disclosure, and be protected by the accompanying claims. Component parts shown in the drawings are not necessarily to scale, and may be exaggerated to better illustrate the important features of the present disclosure. In the drawings, like reference numerals designate like parts throughout the different views, wherein:

DETAILED DESCRIPTION

Apparatus, systems and methods that implement the implementations of the various features of the present disclosure will now be described with reference to the drawings. The drawings and the associated descriptions are provided to illustrate some implementations of the present disclosure and not to limit the scope of the present disclosure. Throughout the drawings, reference numbers are re-used to indicate correspondence between referenced elements.

Figure 1:
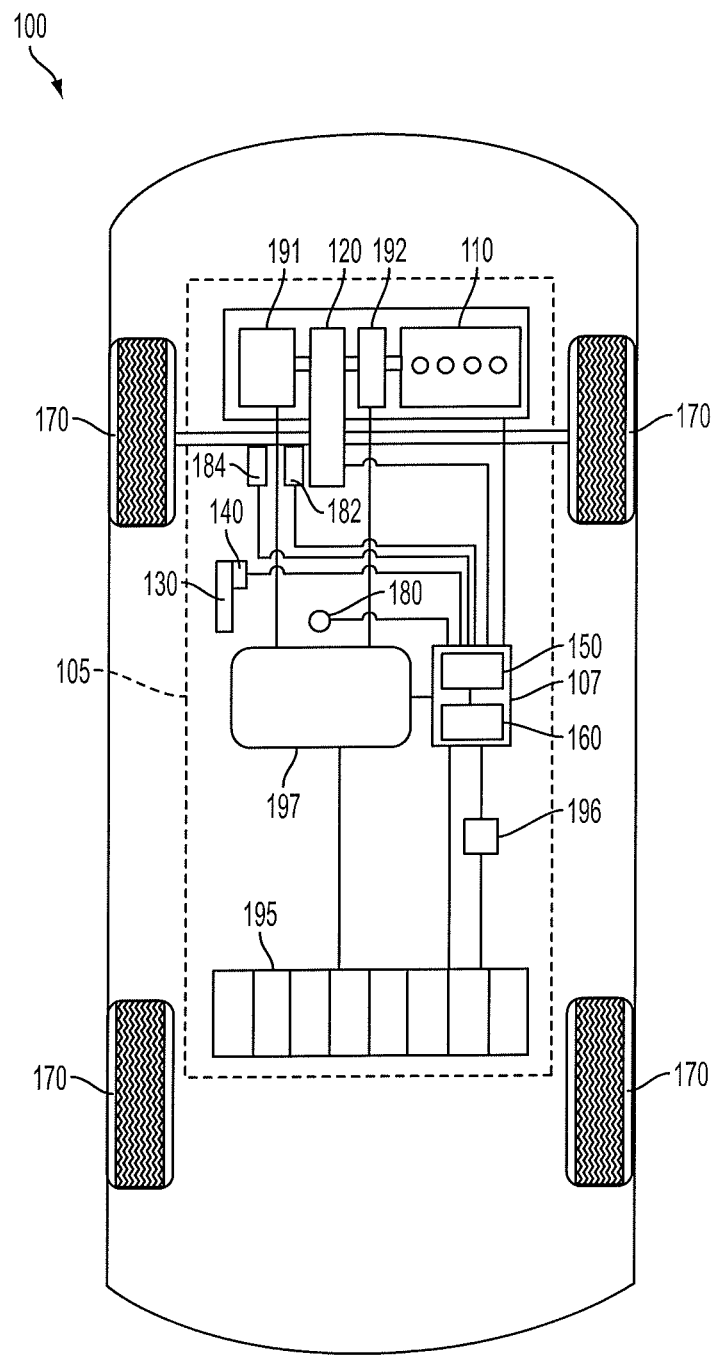
FIG. 1 is a block diagram of a hybrid vehicle according to an implementation of the present disclosure.

In one implementation, the present disclosure includes a block diagram of a hybrid vehicle 100 as shown in FIG. 1. The hybrid vehicle 100 can include a drive force unit 105 and wheels 170. The drive force unit 105 further includes an engine 110, an electric motor-generator 191, an electric motor-generator 192, a battery unit 195, a battery module 196, an inverter box 197, a transmission 120, a hybrid controller module 107, a sensor 180, a speed sensor 182, an accelerometer 184, an accelerator pedal 130, and an accelerator pedal sensor 140. The hybrid controller module 107 further includes a processor 150 and a memory 160.

The engine 110 primarily drives the wheels 170. The engine 110 can be an internal combustion engine. The internal combustion engine can combust fuel, such as gasoline, ethanol, diesel, biofuel, or other types of fuels which are suitable for combustion. The torque output by the engine 110 is received by the transmission 120. The motor-generators 191 and 192 can also output torque to the transmission 120. The engine 110 and the motor-generators 191 and 192 may be coupled through a planetary gear (not shown in FIG. 1). The transmission 120 delivers an applied torque to the wheels 170. The torque output by the engine 110 does not directly translate into the applied torque to the wheels 170.

The motor-generators 191 and 192 can serve as motors which output torque in a drive mode, and can serve as generators to recharge the battery unit 195 in a regeneration mode. The electric power delivered from or to the motor-generators 191 and 192 passes through an inverter box 197 to the battery unit 195.

The accelerator pedal sensor 140 is configured to detect a pressure applied to the accelerator pedal 130. The accelerator pedal sensor 140 may measure a position of the accelerator pedal 130. The position may be measured as a percentage (or amount) applied, or may be measured in degrees. The pressure applied to the accelerator pedal 130 corresponds to a power request from the driver.

The speed sensor 182 is connected to an output shaft of the transmission 120 to detect a speed input which is converted into a vehicle speed by the processor 150. The accelerometer 184 is connected to the body of the hybrid vehicle 100 to detect the actual acceleration or deceleration of the hybrid vehicle 100. The sensor 180 is an additional sensor which may provide data to the processor 150. In one implementation, the sensor 180 may be configured to sense a current or a voltage, in order to determine a speed and torque of the motor-generators 191 and/or 192.

The transmission 120 is a transmission suitable for a hybrid vehicle. The transmission 120 can be an ECVT (electrically controlled variable transmission), which is coupled to the engine 110 as well as the motor-generators 191 and 192. The transmission 120 can deliver torque output from a combination of the engine 110 and the motor-generators 191 and 192. The processor 150 controls the transmission 120, utilizing data stored in the memory 160 to determine the applied torque delivered to the wheels 170.

The battery unit 195 is a rechargeable battery that is capable of being utilized in a vehicle and may include a plurality of battery cells. The battery module 196 is capable of measuring parameters that are communicated to the processor 150 for determining a state of charge (SOC) of the battery unit 195 and/or a SOC of the hybrid vehicle 100. The battery module 196 is further capable of measuring a real battery power. The battery module 196 may measure a voltage, a current, a temperature, charge acceptance; an internal resistance, self-discharges, magnetic properties, a state of health and/or other states or parameters of the battery unit 195. In one implementation, the battery module 196 is a Battery Management System (BMS) which determines the battery power of the battery unit 195 using its sensors and its own processor. In another implementation, the hybrid vehicle 100 may not include a BMS, and the processor 150 may determine the battery power used by the hybrid vehicle 100 using sensor data from the battery module 196.

Because the hybrid vehicle 100 can split power output of the engine 110 and the motor-generators 191 and 192 through the planetary gear, the hybrid controller module 107 can detect how much power is lost in the system. When the driver applies pressure to the accelerator pedal 130, the hybrid controller module 107 receives the driver's power request. The processor 150 then determines how to deliver the power to the wheels 170. The processor 150 determines how much power is needed from the engine 110, as well as how much power is needed from the motor-generators 191 and 192. If the processor 150 determines a portion of the power request should be fulfilled by the engine 110, the rest of the power request would be fulfilled by the motor-generator 191 and/or 192.

Ideally, all the power in the hybrid vehicle 100 would be perfectly balanced. The power from the engine 110 combusting fuels, the electrical power from the battery unit 195 and the motor-generator 191 and/or 192 to the wheels 170, and the mechanical power from the engine 110 to the wheels 170 would be balanced such that the battery unit 195 would not have to charge or discharge. Theoretically, the hybrid vehicle 100 should be able to drive at a given speed, such as 60 mph, and remain at that speed indefinitely as long as fuel is available. The battery unit 195 would remain static.

However, the power request, or power commanded by the hybrid controller module 107 does not always equal the power delivered to the wheels 170. This discrepancy for a given power request and vehicle speed is a system loss. Because of losses, the calculations by the hybrid controller module 107 are imperfect. The hybrid controller module 107 can determine losses because it can detect that less power is delivered to the wheels 170 than was commanded. The hybrid controller module 107 can electrically determine a torque of the motor-generators 191 and 192, which further allows estimation of a torque of the engine 110. In addition, through the battery module 196, the processor 150 can determine the power used by the battery unit 195. When some of the power delivered by the engine 110 is lost by the system components, the battery unit 195 delivers the remaining power requested, which is indicated by a difference between the battery power command and the measured actual battery power.

Current hybrid vehicles may address losses through a feed forward term. During development of the hybrid vehicle, losses may be measured in different conditions. A loss map of losses at various vehicle speeds and power requests may be stored. Hybrid vehicles may then anticipate losses based on the loss map. However, because the losses were determined by bench testing a single specific vehicle or set of vehicles, the values may not necessarily match every vehicle, particularly aged vehicles. In addition, because the values remain static, the hybrid vehicles are constantly trying to cancel out losses as the actual system behavior changes.

Figure 2:
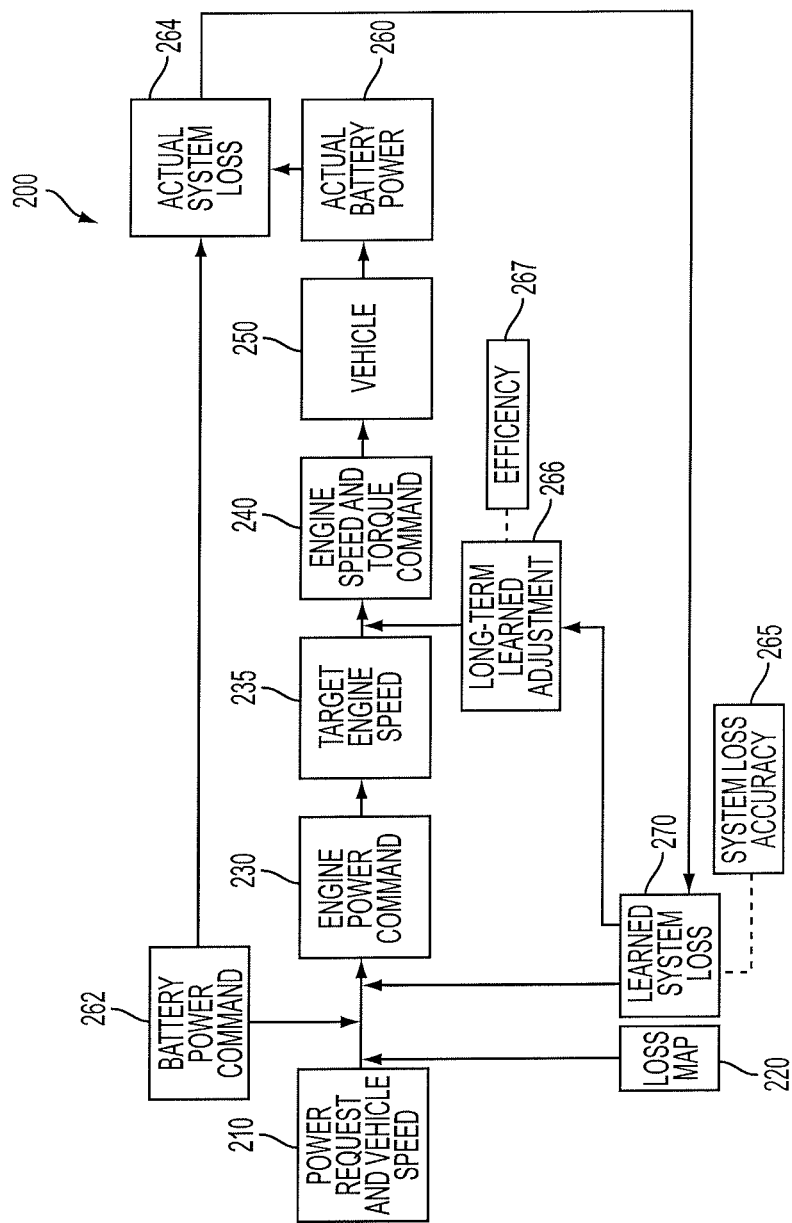
FIG. 2 is a flow diagram of the system loss learning according to an implementation of the present disclosure.

FIG. 2 depicts a flow diagram of one implementation of the present disclosure. At 210, the hybrid controller module 107, through the processor 150, receives a power request from the accelerator pedal 130 and a vehicle speed from the speed sensor 182. At 262, a battery power command is determined based on the condition of the battery. The battery power command can be for charging, discharging, or no power, to maintain the current SOC. At 220, the hybrid controller module 107 looks up an expected loss value for the power request and the vehicle speed. In other implementations, the expected loss value may be stored as time-stamped entries or other appropriate data structures.

At 230, the hybrid controller module 107 determines an engine power command considering the power request, the battery power command, and the expected loss based on the loss map lookup at 220 and the learned system losses at 270.

The engine power command needs to be adjusted for system losses so that enough power is generated to satisfy the requested power at the wheels 170. Before feedback is available, or before the hybrid controller module 107 has learned the system loss for this power request and vehicle speed, the engine power command adjustment for losses is based predominantly on the lookup values from 220. Because the loss map was previously determined during bench testing, the loss map's values do not account for vehicle variations or vehicle age.

At 235, the hybrid controller module 107 determines a target engine speed based on the engine power command from 230. The hybrid controller module 107 chooses the target engine speed that can produce power to fulfill the power request at the vehicle speed. The hybrid controller module 107 then determines an engine speed and torque command at 240 based on the target engine speed of 235. If the hybrid controller module 107 has learned the system loss, a long-term adjustment at 266 further adjusts the engine speed and torque command at 240 to improve the losses and increase efficiency.

At 250, the engine speed and torque command are applied to the hybrid vehicle 100. The hybrid controller module 107 commands the engine 110 to rev at the engine speed and produce the torque command.

At 260, the battery module 196 measures an actual battery power.

At 264, the hybrid controller module 107 uses the actual battery power from 260 and the battery power command from 262 to calculate an actual system loss that is not being correctly accounted for in the engine power command at 230. The system loss can be calculated by subtracting the measured or actual battery power output from the battery power command from 262.

The actual system loss, for the power request and the vehicle speed, is stored in a system loss data as a learned system loss at 270. The hybrid controller module 107 can store the system loss data, specifically in the memory 160. Alternatively, the hybrid controller module 107 may store the system loss data in another memory, which may be on-board or wirelessly connected to the hybrid controller module 107. In other implementations, the system loss data, or portions thereof, may be stored in the loss map at 220, or may update values in the loss map.

The hybrid controller module 107 uses the system loss data to improve system loss accuracy, seen at 265. Because the system loss data is populated with data from actual vehicle feedback, the system loss data provides more accurate and timely data than the loss map at 220. The system loss data allows the hybrid controller module 107 to learn the system loss for the power request and the vehicle speed in order to minimize the error in estimating a system loss when the same power request and vehicle speed is later encountered.

The hybrid controller module 107 also uses the system loss data for long-term learning adjustment at 266. Once the hybrid controller module 107 has learned the system loss for the power request and the vehicle speed, the hybrid controller module 107 can use the feedback to determine a more efficient engine speed and torque command at 240. The hybrid controller module 107 chooses the engine speed and torque to minimize the actual loss total, including the loss accounted for in the loss map at 220. Because system losses equate to wasted power, minimizing system losses improves efficiency, as seen at 267. As the hybrid controller module 107 learns the system losses through subsequent cases, the hybrid controller module 107 builds upon the system loss data to further improve system loss accuracy and efficiency. Because the hybrid controller module 107 is constantly learning the system losses based on feedback, the hybrid controller module 107 is capable of dynamically learning and updating the adjustments over time. The system losses may vary over time, due to changing conditions. For example, the hybrid controller module 107 can learn the system losses as the hybrid vehicle 100 ages.

Figure 3:
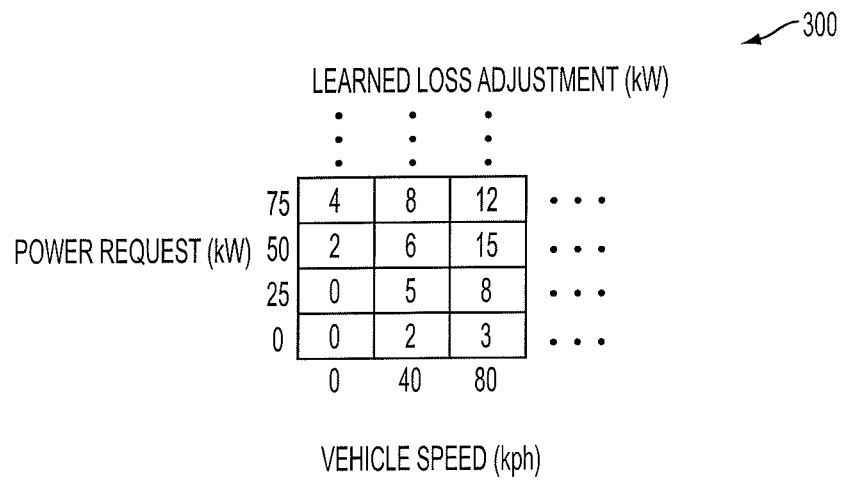
FIG. 3 is a graph of learned losses according to an implementation of the present disclosure.

FIG. 3 depicts a portion of a learned loss adjustment table 300. The values shown are exemplary, but do not necessarily represent an actual set of values for a hybrid vehicle. The loss map and/or the system loss data may include a look-up table similar to the learned loss adjustment table 300. The rows correspond to power requests and the columns correspond to vehicle speeds. Alternatively, the rows and columns may be swapped. The learned loss adjustment table 300 holds values for improving system loss accuracy.

Figure 4:
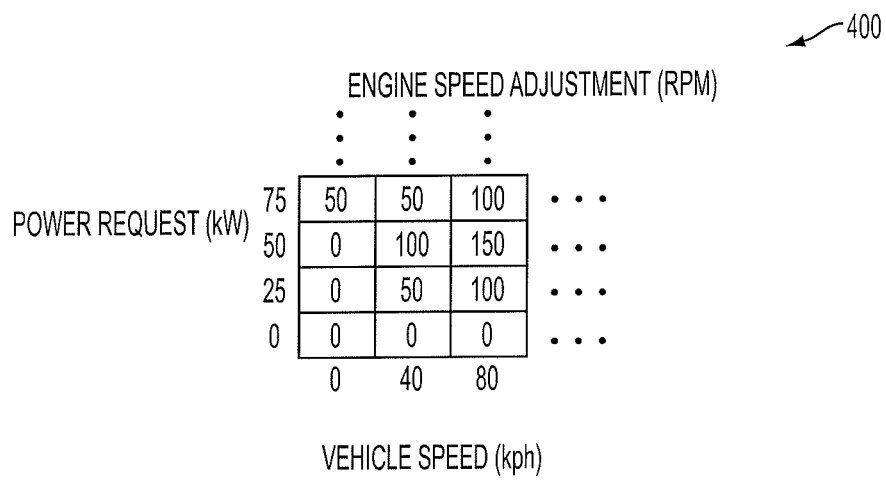
FIG. 4 is a graph of engine speed adjustments according to an implementation of the present disclosure.

FIG. 4 depicts a portion of an engine speed adjustment table 400. The values shown are exemplary, but do not necessarily represent an actual set of values for a hybrid vehicle. The system loss data may include a look-up table similar to the engine speed adjustment table 400. In alternative implementations, the system loss data includes similar data arranged in a different fashion, such that the system loss data is not limited to only look-up tables. The rows correspond to power requests and the columns correspond to vehicle speeds. Alternatively, the rows and columns may be swapped. The engine speed adjustment table 400 holds values for improving efficiency.

The learned loss adjustment table 300 may be the look-up table for the loss map at 220 or the learned system loss at 270 in FIG. 2. The loss map at 220 and the learned system loss at 270 may be separate learned loss adjustment tables. The loss map at 220 is filled with predetermined values, whereas the learned system loss at 270 starts with 0 values, and is updated with values which also account for the values from the loss map as the hybrid controller module 107 learns the losses. Alternatively, the loss map at 220 and the learned system loss at 270 may be the same table, which is updated. For a given power request at a given vehicle speed, the loss map reads an appropriate adjustment. As an example, at a vehicle speed of 40 kph and a power request of 25 kW, the learned loss adjustment may be 5 kW.

The engine speed adjustment table 400 may be the look-up table for the long-term learned adjustment at 266 in FIG. 2. The engine speed adjustment values improve efficiency at a given vehicle speed and power request. For example, at 40 kph and a power request of 50 kW, the optimal engine speed adjustment may be 100 rpm, as read from the engine speed adjustment table 400.

The system loss data may include the learned loss adjustment table 300 and the engine speed adjustment table 400, which may further be combined into a matrix. In other implementations, the system loss data may be stored in another suitable data structure.

As the hybrid controller module 107 encounters the same conditions, the hybrid controller module 107 updates the values in the learned loss adjustment table 300. Therefore, the learned loss adjustment table 300 may reflect the most current and accurate set of adjustment values. The engine speed adjustment table 400 remains static. However, in certain implementations, the hybrid controller module 107 may update the engine speed adjustment table 400 as well in order to improve the losses and increase efficiency.

Figure 5:
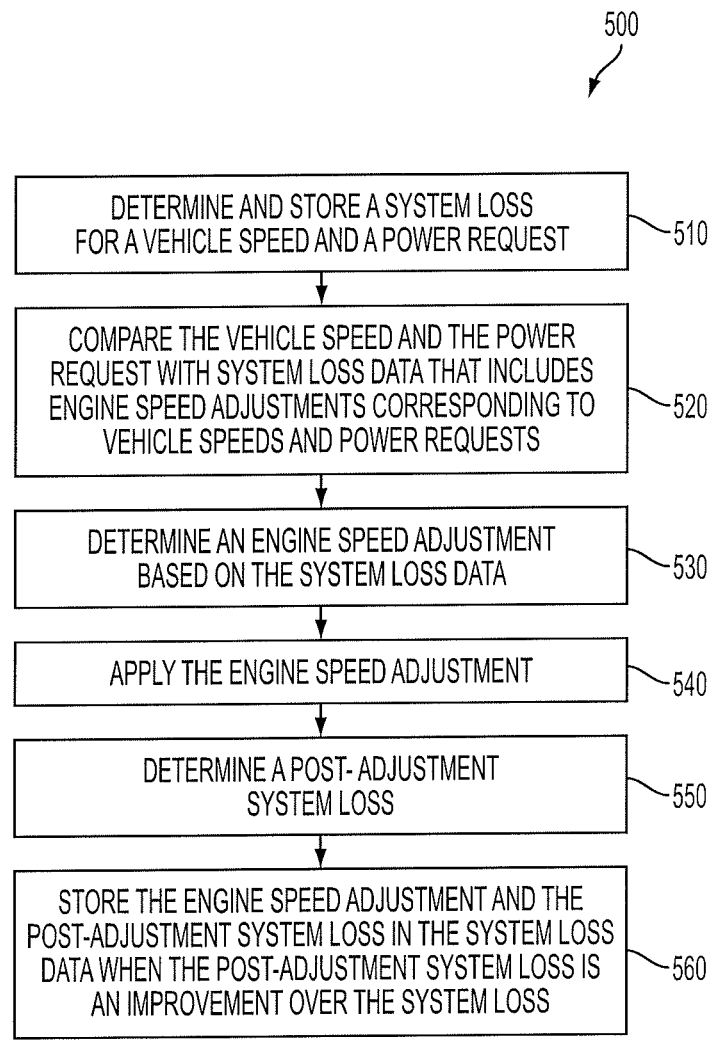
FIG. 5 is a flowchart of a system loss-learning logic according to an implementation of the present disclosure.

FIG. 5 depicts a flowchart 500 of a method for long-term system loss learning to improve control accuracy and optimize fuel efficiency that may be executed by the hybrid controller module 107.

At 510, the hybrid controller module 107, through the processor 150, determines and stores a system loss for a vehicle speed and a power request. The vehicle speed is detected by the speed sensor 182. The power request is detected by the accelerator pedal sensor 140. The hybrid controller module 107 determines the system loss by comparing a battery power commanded by the hybrid controller module 107 with the measured actual battery power. When the driver requests power by pressing the accelerator pedal 130, the hybrid controller module 107 determines what power the engine 110 should provide to account for the system losses and deliver the requested power at the wheels 170. Since the battery unit 195 must provide any additional power that is not correctly accounted for as a system loss, measuring the actual battery power output and comparing to the battery power command provides an estimate of an actual system loss that should be stored as an adjustment to the engine power command. To more accurately measure the system loss, the hybrid controller module 107 may require a steady speed state, having little to no vehicle acceleration. In certain implementations, the hybrid controller module 107 may require that the vehicle acceleration measured by the accelerometer 184 be below an acceleration threshold.

At 520, the hybrid controller module 107 compares the vehicle speed and the power request with system loss data that includes engine speed adjustments corresponding to vehicle speeds and power requests. The processor 150 retrieves the system loss data from the memory 160. The system loss data may include maps, such as the learned loss adjustment table 300 in FIG. 3 and the engine speed adjustment table 400 in FIG. 4.

The hybrid controller module 107 looks up a predetermined engine speed adjustment for the current vehicle speed and power request from the engine speed adjustment table 400 and a corresponding expected loss from the system loss data. The expected loss may correspond to a system loss to be expected if the predetermined engine speed adjustment is applied.

Turning back to FIG. 5, at 530, the hybrid controller module 107 determines an engine speed adjustment based on the system loss data. If the expected loss and/or the system loss is below a tolerable threshold, the hybrid controller module 107 can decide to use the predetermined engine speed adjustment. Otherwise, the hybrid controller module 107 can decide to modify the predetermined engine speed adjustment in an attempt to further improve the system loss. The modification may be based on values from the engine speed adjustment table 400, if available. The modification may further be based on feedback such as battery power measurements from the battery module 196.

Once the hybrid controller module 107 determines the engine speed adjustment, at 540, the hybrid controller module 107 applies the engine speed adjustment. Then, at 550, the hybrid controller module 107 determines a post-adjustment system loss. In certain implementations, the hybrid controller module 107 may repeat 530-550 for a set number of iterations, or until the post-adjustment system loss is below a tolerable threshold or is an improvement over the expected loss.

At 560, the processor 150 stores the engine speed adjustment and the post-adjustment system loss in the system loss data when the post-adjustment system loss is an improvement over the system loss. The processor 150 may store the engine speed adjustment in the engine speed adjustment table 400. The processor 150 may further analyze the engine speed adjustment and the post-adjustment system loss and store the analysis in the memory 160. The processor 150 may store additional parameters, such as engine torque, wheel speed, wheel torque, etc. and may store additional conditions, such as road conditions, age of components, etc. The processor 150 may also store data needed for long-term learning of system losses.

With the updated system loss data, the hybrid controller module 107 can determine an improved engine speed adjustment over the previously utilized engine speed adjustment at any given vehicle speed and power request. As the hybrid controller module 107 updates the system loss data over time, the hybrid controller module 107 learns the optimal engine speed adjustment for a given vehicle speed and power request. In addition, as the hybrid vehicle 100 performance changes over time, i.e. due to aging of components, the engine speed adjustments will be further adjusted as the hybrid controller module 107 learns of the changed system losses.

Those of ordinary skill would appreciate that the various illustrative logical blocks, modules, and algorithm steps described in connection with the examples disclosed herein may be implemented as electronic hardware, computer software, or combinations of both. Furthermore, the present application can also be embodied on a machine readable medium causing a processor or computer to perform or execute certain functions.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The various illustrative logical blocks, units, modules, and circuits described in connection with the examples disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the examples disclosed herein may be embodied directly in hardware, in a software module executed by a processor, or in a combination of the two. The steps of the method or algorithm may also be performed in an alternate order from those provided in the examples. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described implementations are to be considered in all respects only as illustrative and not restrictive and the scope of the application is, therefore, indicated by the appended claims rather than by the foregoing description. All changes which come within the meaning and range of equivalency of the claims are to be embraced within their scope.

What is claimed is:

1. A system for hybrid vehicle system loss learning comprising:
    an engine;
    a motor-generator;
    a battery;
    a battery module configured to measure a battery power of the battery;
    a memory configured to store system loss data including engine speed adjustments corresponding to vehicle speeds and power requests; and
    a processor configured to determine a system loss for a vehicle speed and a power request, compare the system loss with an expected loss for the vehicle speed and the power request, apply an engine speed adjustment based on the system loss data, and store the engine speed adjustment and a post-adjustment system loss in the system loss data when the engine speed adjustment improves the system loss.

2. The system of claim 1, wherein the battery module measures the battery power based on a current and/or a voltage of the battery.

3. The system of claim 1, wherein the processor is further configured to determine the system loss by comparing a battery power command with a measured battery power output.

4. The system of claim 1, wherein the system loss data further comprises a map of learned system losses corresponding to the vehicle speeds and the power requests.

5. The system of claim 1, wherein the system loss data further comprises a map of engine speed adjustments corresponding to the vehicle speeds and the power requests.

6. The system of claim 5, wherein the processor is further configured to store the engine speed adjustment in the map based on the vehicle speed and the power request.

7. A hybrid vehicle comprising:
    an engine;
    a motor-generator;
    a battery;
    a battery module configured to measure a battery power of the battery; and
    a hybrid controller module configured to store system loss data including engine speed adjustments corresponding to vehicle speeds and power requests, determine a system loss for a vehicle speed and a power request, compare the system loss with an expected loss for the vehicle speed and the power request, apply an engine speed adjustment based on the system loss data, and store the engine speed adjustment and a post-adjustment system loss in the system loss data when the engine speed adjustment improves the system loss.

8. The hybrid vehicle of claim 7, wherein the battery module measures the battery power based on a current and/or a voltage of the battery.

9. The hybrid vehicle of claim 7, wherein the hybrid controller module is further configured to determine the system loss by comparing a battery power command with a measured battery power output.

10. The hybrid vehicle of claim 7, wherein the system loss data further comprises a map of learned system losses corresponding to the vehicle speeds and the power requests.

11. The hybrid vehicle of claim 7, wherein the system loss data further comprises a map of engine speed adjustments corresponding to the vehicle speeds and the power requests.

12. The hybrid vehicle of claim 11, wherein the hybrid controller module is further configured to store the engine speed adjustment in the map based on the vehicle speed and the power request.

13. A method for long-term system loss learning in a hybrid vehicle comprising:
    determining, using a processor, a system loss for a vehicle speed and a power request;
    comparing, using the processor, the vehicle speed and the power request with system loss data including engine speed adjustments corresponding to vehicle speeds and power requests;
    determining, using the processor, an engine speed adjustment based on the system loss data;
    applying the engine speed adjustment;
    determining, using the processor, a post-adjustment system loss; and
    storing, in a memory, the engine speed adjustment and the post-adjustment system loss in the system loss data when the post-adjustment system loss is an improvement over the system loss.

14. The method of claim 13, wherein the storing the engine speed and the system loss further comprises storing, in the memory, the vehicle speed and the power request.

15. The method of claim 13, wherein the determining the system loss further comprises comparing, using the processor, the battery power command with an actual battery power.

16. The method of claim 13, wherein the determining the engine speed adjustment further comprises shifting an engine speed until the system loss is improved.

17. The method of claim 13, wherein the system loss data includes a map of the engine speed adjustments for the vehicle speeds and the power requests.

18. The method of claim 17, wherein the map is initialized with predetermined values.

19. The method of claim 17, wherein the map is initialized with 0 values.

20. The method of claim 17, wherein the determining the engine speed adjustment further comprises, using the processor, looking up a stored engine speed adjustment from the map.

21. A system for hybrid vehicle system loss learning comprising:
    an engine;
    a motor-generator;
    a battery;
    a battery module configured to measure a battery power of the battery;
    a memory configured to store system loss data including engine speed adjustments corresponding to vehicle speeds and power requests; and
    a processor configured to
        determine a system loss for a vehicle speed and a power request, compare the system loss with an expected loss for the vehicle speed and the power request,
apply an engine speed adjustment based on the stored system loss data, and
perform at least one of updating the system loss data or storing additional system loss data in the memory.

* * * * *